(12) United States Patent
Xiao et al.

(10) Patent No.: US 8,121,121 B2
(45) Date of Patent: Feb. 21, 2012

(54) COMMUNICATION SYSTEM, DEVICE, METHOD FOR HANDING OVER A ROUTE AND METHOD FOR NOTIFYING A STATE OF ADVERTISING A LABEL

(75) Inventors: Jiguang Xiao, Shenzhen (CN); Hui Ni, Shenzhen (CN); Ying Chen, Shenzhen (CN); Jian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 182 days.

(21) Appl. No.: 12/561,412

(22) Filed: Sep. 17, 2009

(65) Prior Publication Data

US 2010/0008373 A1 Jan. 14, 2010

Related U.S. Application Data

(63) Continuation of application No. PCT/CN2008/000520, filed on Mar. 17, 2008.

(30) Foreign Application Priority Data

Mar. 20, 2007 (CN) .......................... 2007 1 0087477

(51) Int. Cl.
*H04L 12/56* (2006.01)
*H04J 1/16* (2006.01)
(52) U.S. Cl. ........ 370/389; 370/282; 370/252; 370/386; 370/419
(58) Field of Classification Search .................. 370/389, 370/386, 282, 252, 419
See application file for complete search history.

(56) References Cited

U.S. PATENT DOCUMENTS

| | | | |
|---|---|---|---|
| 6,721,269 B2 * | 4/2004 | Cao et al. ...................... | 370/227 |
| 2003/0137971 A1 | 7/2003 | Gibson et al. | |
| 2008/0162637 A1 * | 7/2008 | Adamczyk et al. ........... | 709/204 |
| 2011/0085440 A1 * | 4/2011 | Owens et al. ................. | 370/216 |

FOREIGN PATENT DOCUMENTS

| | | |
|---|---|---|
| CN | 1710993 | 12/2005 |
| CN | 1716942 A | 1/2006 |
| CN | 1756184 | 4/2006 |

(Continued)

OTHER PUBLICATIONS

Andersson, L. et al. LDP Specification IETF Standard-Working-Draft, Internet Engineering Task Force, IETF. Jan. 2001.

(Continued)

*Primary Examiner* — John Pezzlo
(74) *Attorney, Agent, or Firm* — Brinks Hofer Gilson & Lione (57) ABSTRACT

The present invention relates to a field of communication technology, and more particularly to a communication system, a label switched router, a network device, a method for handing over a route, and a method for notifying a state of advertising a label so as to improve an accuracy occasion for handing over a route. A liberal LSP between an upstream LSR and a downstream LSR is established; it is confirmed that establishing the liberal LSP is accomplished; a handover notification is sent to the upstream LSR; and the upstream LSR hands over the route according to the handover notification. By adopting such technical solution, the accuracy occasion for handing over the route is improved so as to avoid label forwarding interruption, and reduce the influences on the convergence time of handing over the route.

12 Claims, 8 Drawing Sheets

FOREIGN PATENT DOCUMENTS

| | | |
|---|---|---|
| CN | 1816040 A | 8/2006 |
| CN | 1859431 A | 11/2006 |
| CN | 101022420 | 8/2007 |
| CN | 100558082 C | 11/2009 |
| WO | 2006/045356 A1 | 5/2006 |

OTHER PUBLICATIONS

Thomas, Bob "draft-thomas-mpls-1dp-capabilities -00.txt" IETF Standard-Working-Draft, Internet Engineering Task Force, IETF. Jun. 1, 2006.

Andersson, L. et al. "LDP Specification; draft—ietf-mpls-rfc3036bis-04.txt" IETF Standard-Working-Draft, Internet Engineering Task Force, IETF. Sep. 1, 2006.

Atalas, A. et al. "Basic Specification for IP Fast-Reroute: Loop-Free Alternates; draft ietf-rtgwg-ipfrr-spec =base-06.txt" IETF Standard-Working-Draft, Internet Engineering Task Force, IETF. Mar. 1, 2007.

Asati, Rajiv, et al.. "LDP End-of LIB—draft-ietf-mpls-ldp-end-of lib-03.txt" IETF Standard-Working-Draft, Internet Engineering Task Force, IETF. Jan. 14, 2009.

Jork, M. et al.. "LDP IGP Synchronization" IETF Standard-Working-Draft, Internet Engineering Task Force, IETF. Mar. 2009.

Written Opinion of the International Searching Authority issued in corresponding PCT Application No. PCT/CN2008/000520; mailed Jul. 3, 2008.

Chinese Office issued in corresponding Chinese Patent Application No. 2007100874778; issued Mar. 6, 2009.

Supplementary European Search Report issued in corresponding European Patent Application No. 08 71 4973; issued Dec. 15, 2009.

Office Action issued in corresponding European Patent Application No. 08714973.8, mailed Oct. 4, 2011.

Sharma et al., "Framework for Multi-Protocol Label Switching (MPLS)-based Recovery", Network Working Group, Feb. 2003. XP-15009252A.

\* cited by examiner

COMMUNICATION SYSTEM, DEVICE, METHOD FOR HANDING OVER A ROUTE AND METHOD FOR NOTIFYING A STATE OF ADVERTISING A LABEL

CROSS-REFERENCE TO RELATED APPLICATIONS

This application is a continuation of International Patent Application No. PCT/CN2008/000520, filed on Mar. 17, 2008, which claims priority to Chinese Patent Application No. 200710087477.8, filed on Mar. 20, 2007; both of which are incorporated by reference herein in their entireties.

FIELD OF THE TECHNOLOGY

The present invention relates to a field of communication technology, and more particularly to a communication system, a label switched router, a network device, a method for handing over a route, and a method for notifying a state of advertising a label.

BACKGROUND

Multi-protocol label switching (MPLS) supports multi-level labels and connection-oriented and is highly scalable, which provides various services for clients on a unified MPLS/IP-based network structure. A label distribution protocol (LDP) is a control protocol of the MPLS, and is equivalent to a signaling protocol in the prior network, which performs a series of operations including classification of forwarding equivalence class (FEC), label distribution, and establishment and maintenance of a label switched path (LSP). As the MPLS has increasingly become a basic technique for large-scale networks, the LDP, as an exclusive protocol for label distribution, has also attracted more and more attention.

Through the LDP, a label switched router (LSR) may directly map the route information of a network layer to a switched path of a data link layer so as to establish LSP on the network layer. The LSP may be established between two neighboring LSRs, and may also be terminated at an outlet node of the network, so that the label switch is adopted on all the intermediate nodes in the network. In the MPLS/IP network, if the LSP between two LSRs is not successfully established, packets are still forwarded in an IP forwarding manner, and till the LSP is successfully established, the packets can be forwarded in a label forwarding manner.

If the LDP initiating process of two LSRs is successfully accomplished, they become LDP peer entities, that is, LDP neighbors, which may exchange advertisement messages with each other. A label mapping message is one type of LDP advertisement messages, and includes a label, an FEC, and other information. Considering the data forwarding direction, when the relative positions between the two LSRs are described, the terms of upstream and downstream are adopted, and the packets are sent from an upstream LSR to a downstream LSR. In an MPLS system, the downstream LSR decides to distribute the label to a specific FEC and then notifies the upstream LSR, that is, the LSP label is distributed from the downstream to the upstream. When the LSP is established, the LSR distributes a label to the FEC, and sends a label mapping message to the upstream LSR, and after the upstream LSR receives all label mapping messages from the downstream LSR, the LSP between the two LSRs is established. The local LSR may decide when to send the label mapping message, and may also decide how to process the received label mapping message.

When the label retention manner of one LSR is a Liberal manner, if the LSR receives the label mapping message sent from the downstream, no matter whether the downstream is the next hop of the route of the LSR itself, the LSR keeps the label. In this case, the LDP generates one liberal LSP. If a liberal LSP is generated between two LSRs, once the route is changed into a forwarding path of the liberal LSP, the liberal LSP is quickly changed to a Normal LSP so as to forward the traffic with the label. The liberal LSP and the Normal LSP are two opposite concepts. When the liberal LSP is generated, the LSR does not forward the label according to this path, and when the liberal LSP is changed into the Normal LSP, the LSR forwards the label according to this LSP.

After an LDP session is established, if the route information is changed, the LSP is changed accordingly, and thus the LSP is required to be re-established. If a great number of route information (for example, 20,000 pieces) are changed on one LSR, certain convergence time is required from the end of handing over the route to the successful establishment of a great number of LSPs. Thus, in the convergence time, the packets can only be forwarded in the IP forwarding manner, so that the label forwarding manner is interrupted. During the handover process among label forwarding-IP forwarding-label forwarding, the flow loss problem may occur. If before establishing the LSP is accomplished, the packets are enabled to be forwarded in the label forwarding path before the route is changed, that is, the handing over the route is performed after the liberal LSP is entirely established successfully and then the liberal LSP is changed to the Normal LSP, the label forwarding interruption caused by the excessively long time spent on establishing the LDP session and the LSP can be avoided.

Figure 1:
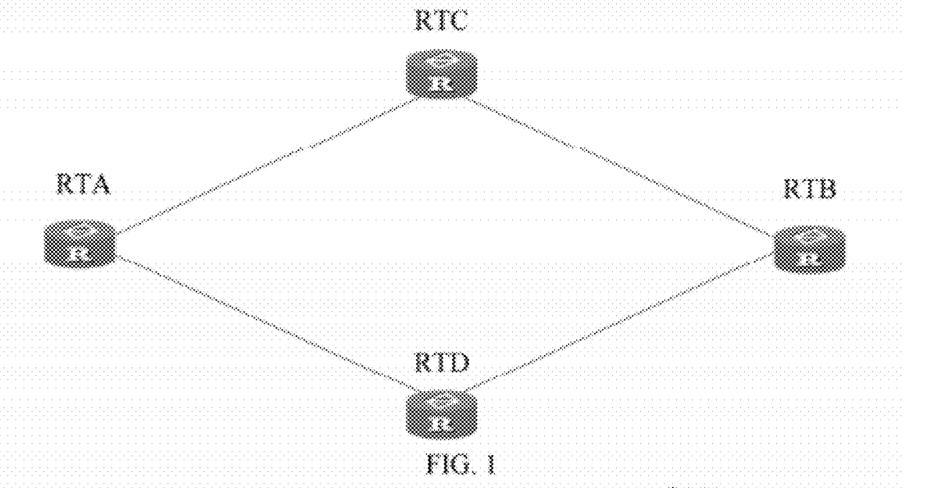
FIG. 1 is a schematic view of a ring topology formed by four connected LSRs.

A typical application scenario of the above technique is handing over the route between two links, in which the reasons of handing over the route may be closing an interface, restarting a system, modifying a Cost value of the link, etc. In a ring topology formed by four connected LSRs as shown in FIG. 1, RTA to RTD are routers. Assuming that a link between RTB and RTC is interrupted (for example, the interface is closed), the RTA calculates that a route to the RTB should be a path of RTA-RTD-RTB, and the packets are routed along the label forwarding path of RTA-RTD-RTB. Assuming that the link between the RTB and the RTC is recovered, the RTA calculates that a route to the RTB should select a path of RTA-RTC-RTB, and in this case, after the route to be selected is changed (that is, indicating that the label forwarding direction to be adopted is RTA-RTC-RTB), the handing over the practical route is not performed, that is, the packets are still forwarded along the former label forwarding direction of RTA-RTD-RTB. However, meanwhile, the liberal LSP of RTA-RTC-RTB is established. After the liberal LSP is entirely established successfully, the route and the label forwarding path are handovered, so that the liberal LSP is changed to the Normal LSP, that is, the packets are forwarded along the label forwarding direction of RTA-RTC-RTB.

Figure 2:
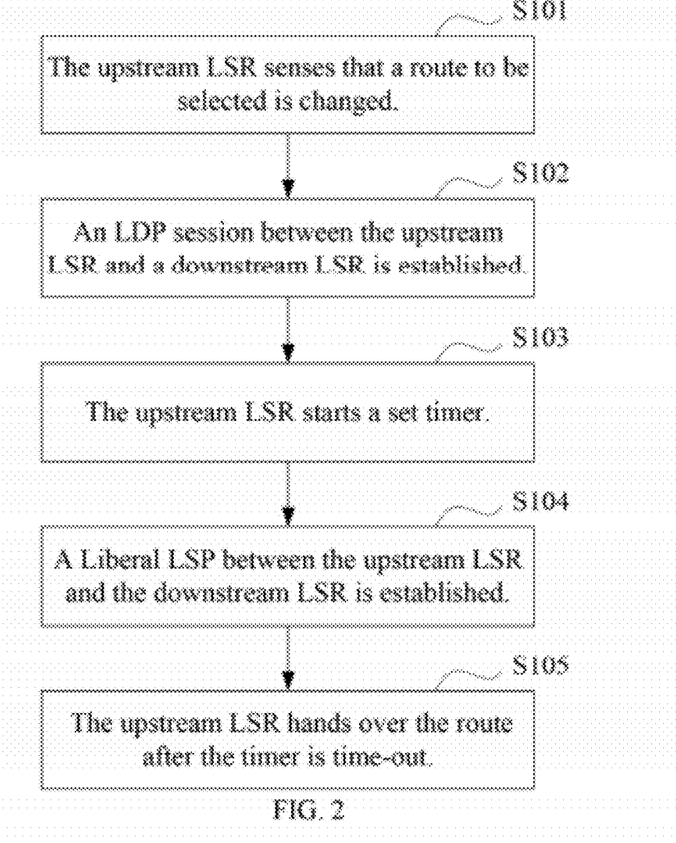
FIG. 2 is a flow chart of handing over a route by an upstream LSR according to the prior art.

Currently, referring to FIG. 2, a flow of handing over the route by the upstream LSR includes the steps as follows.

In Step S101, the upstream LSR senses that a route to be selected is changed.

In Step S102, an LDP session between the upstream LSR and a downstream LSR is established.

In Step S103, the upstream LSR starts a set timer.

In Step S104, a liberal LSP between the upstream LSR and the downstream LSR is established.

In Step S105, the upstream LSR hands over the route after the timer is time-out.

The time of the timer may be configured by a user, or a certain empirical value is taken as a default time interval. Before the timer is time-out, the packets are still forwarded in the label forwarding path before the route is changed, the LDP may receive the label mapping message sent from the downstream for establishing the liberal LSP. As long as the timer is time-out, the route is handovered to enter the situation after the changing process, and the packet forwarding path is handovered accordingly.

The inventors find that, the setting of a timer aims at controlling the occasion for handing over the route and the LSP. However, when a great amount of liberal LSPs are established, the required time is closely associated with a processing speed, network state, and topology environment of the router and the like. During the practical applications, the timer may be time-out, but the liberal LSPs are not entirely established. Alternatively, the liberal LSPs have already been successfully established, but the timer is not time-out. If the former situation occurs, that is, during handing over the route, a part of the liberal LSPs is not successfully established yet, so that the label forwarding is interrupted. If the latter situation occurs, that is, the handing over the route is still not performed after the liberal LSPs have already been established, so that the convergence time of handing over the route is affected. Therefore, it cannot accurately determine that the liberal LSPs are re-established successfully by using a timer, and then handover the route.

SUMMARY

The embodiments of the present invention provide a communication system, a label switched router, a network device, a method for handing over a route, and a method for notifying a state of advertising a label, thereby improving an accuracy occasion for handing over a route.

An embodiment of the present invention provides a method of handing over a route including the following.

A label switched path between an upstream label switched router and a downstream label switched router is established.

A notification message representing that sending a label mapping message is accomplished is received, establishing the label switched path is accomplished is confirmed, and the notification message representing that sending the label mapping message is accomplished is a handover notification sent by the downstream label switched router.

An embodiment of the present invention provides a method for notifying a state of advertising a label, including the following.

A label is advertised to a label switched path neighbor.

A notification message representing that advertising the label is accomplished is sent after advertising the label is accomplished so as to notify the label switched path neighbor that advertising the label is accomplished.

An embodiment of the present invention further provides a label switched router, which includes a receiving module, a judging module, and a handover module.

The receiving module is adapted to receive a message.

The judging module is adapted to judge whether the message received by the receiving module is a handover notification sent by a downstream label switched router of the label switched router or not, in which the handover notification identifies that a liberal label switched path between the label switched routers is accomplished.

The handover module is adapted to handover a route after the judging module determines that the message is the handover notification.

An embodiment of the present invention further provides a label switched router, which includes a sending module, a path establishing module, and a detecting module.

The sending module is adapted to send a message.

The path establishing module is adapted to establish a liberal label switched path between the label switched router and an upstream label switched router thereof through the sending module.

The detecting module is adapted to detect whether establishing the label switched path is accomplished or not, and instruct the sending module to send a handover notification to the upstream label switched router when detecting that establishing the label switched path is accomplished.

An embodiment of the present invention further provides a communication system, which includes a first label switched router and a second label switched router.

The first label switched router is adapted to confirm that establishing a liberal label switched path between the first label switched router and an upstream label switched router thereof is accomplished, and send a handover notification to the upstream label switched router.

The second label switched router is adapted to handover a route according to the handover notification.

An embodiment of the present invention further provides a network device, which includes a receiving module and a responding module.

The receiving module is adapted to receive a message.

The responding module is adapted to perform a responding operation after the receiving module receives a notification message that advertising a label is accomplished sent by a label switched path neighbor.

An embodiment of the present invention further provides a network device, which includes a sending module, a label advertising module, and a detecting module.

The sending module is adapted to send a message.

The label advertising module is adapted to advertise a label to an LDP neighbor of the network device through the sending module.

The detecting module is adapted to detect whether advertising the label of the network device is accomplished or not, and instruct the sending module to send a notification that advertising the label is accomplished to the LDP neighbor when detecting that advertising the label is accomplished.

An embodiment of the present invention further provides a communication system, which includes a first network device and a second network device.

The first network device is adapted to confirm that advertising a label is accomplished between the first network device and an LDP neighbor, that is, the second network device, and send a notification message representing that advertising the label is accomplished to the second network device.

The second network device is adapted to perform a responding operation according to the notification message representing that advertising the label is accomplished.

During the embodiments of the present invention, after confirming that establishing the liberal LSP between the downstream LSR and the upstream LSR is accomplished, the downstream LSR notifies the upstream LSR to handover the route. The liberal LSP is established sequentially from downstream to upstream, so that the downstream LSR can more accurately confirm that establishing the liberal LSP is accomplished according to a processing situation of the downstream LSR, thereby improving the accuracy occasion for handing over the route. By adopting the technical solution of the present invention, an accurate occasion for handing over the route is obtained so as to avoid the label forwarding interruption and reduce the influences on the convergence time of handing over the route.

BRIEF DESCRIPTION OF THE DRAWINGS

FIG. 12 is another block diagram of a communication system according to the present invention;

DETAILED DESCRIPTION

In the embodiments of the present invention, a liberal LSP between an upstream LSR and a downstream LSR is established; it is confirmed that establishing the liberal LSP is accomplished; a handover notification is sent to the upstream LSR; and the upstream LSR hands over the route according to the handover notification.

In the embodiments of the present invention, the detailed process that the downstream LSR notifies the upstream LSR includes, for example, sending, a special label mapping message to the upstream LSR by the downstream LSR.

The embodiment of the present invention is further described below with reference to the accompanying drawings.

When the liberal LSP is established, the downstream LSR sends a label mapping message to the upstream LSR. In one embodiment of the present invention, the downstream LSR confirms that establishing the liberal LSP is accomplished according to the label mapping message. After sending all label mapping messages, the downstream LSR confirms that establishing the liberal LSP is accomplished. In one embodiment of the present invention, a special label mapping message is defined, and after sending all the label mapping messages to the upstream LSR, the downstream LSR sends the special label mapping message to the upstream LSR, in which the special label mapping message is adapted to identify that establishing the liberal LSP is accomplished and the route may be handovered. After receiving the special label mapping message, the upstream LSR gets to know that establishing the liberal LSP is accomplished, and the route may be handovered. Therefore, after receiving the special label mapping message, the upstream LSR may handover the route. In this embodiment, the upstream LSR determines that establishing the liberal LSP is accomplished based on the special label mapping message, and the special label mapping message may accurately represent the time when establishing the liberal LSP is accomplished. Therefore, the upstream LSR may accurately determine the occasion for handing over the route according to the time for receiving the special label mapping message.

Figure 3:
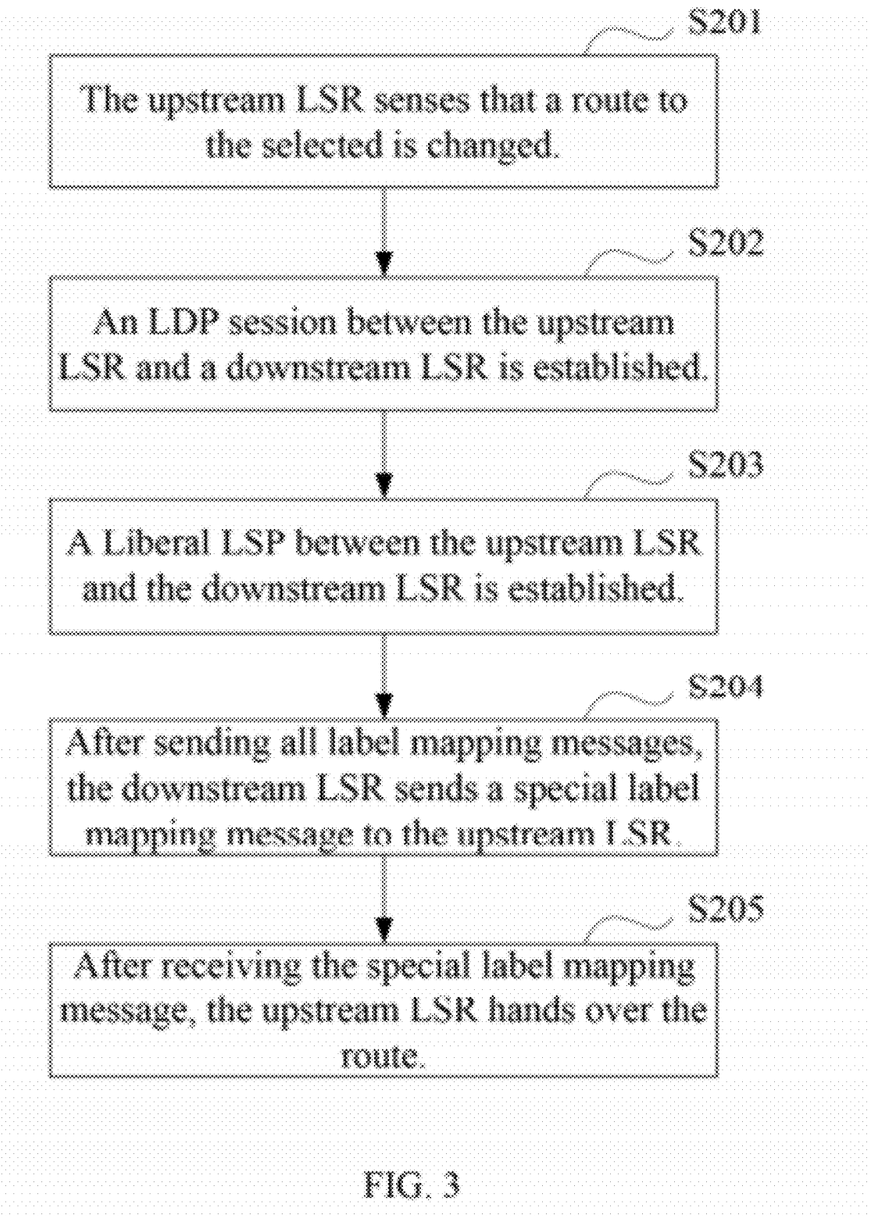
FIG. 3 is a flow chart of handing over a route by an upstream LSR according to a first embodiment of the present invention.

In one embodiment of the present invention, referring to FIG. 3, a flow of handing over the route by an upstream LSR includes the steps as follows.

In Step S201, the upstream LSR senses that a route to the selected is changed.

In Step S202, an LDP session between the upstream LSR and a downstream LSR is established.

In Step S203, a liberal LSP between the upstream LSR and the downstream LSR is established.

When the liberal LSP is newly established, the downstream LSR distributes a label according to different FECs, and then sends a label mapping message carrying the FEC, the label, and other information to the upstream LSR.

In Step S204, after sending all label mapping messages, the downstream LSR sends a special label mapping message to the upstream LSR.

After sending all the label mapping messages to the upstream LSR, the downstream LSR confirms that establishing all the liberal LSPs between the downstream LSR and the upstream LSR are accomplished, and sends the special label mapping message to the upstream LSR, and the special label mapping message is a handover notification sent by the downstream LSR.

The special label mapping message herein is a notification message representing that sending all label mapping messages to the upstream LSR by the downstream LSR is accomplished. When the liberal LSP between the upstream LSR and the downstream LSR is established, sending the special label mapping message by the downstream LSR representing that establishing the liberal LSP is accomplished, and the upstream LSR may perform the route handover and other operations.

In Step S205, after receiving the special label mapping message, the upstream LSR hands over the route.

In this embodiment, the upstream LSR may handover the route without taking the timer provided in the prior art as the reference. However, during the specific realization, the special label mapping message may be combined with a timer. In another embodiment of the present invention, referring to FIG. 4, a flow of handing over route by an upstream LSR includes the steps as follows.

Figure 4:
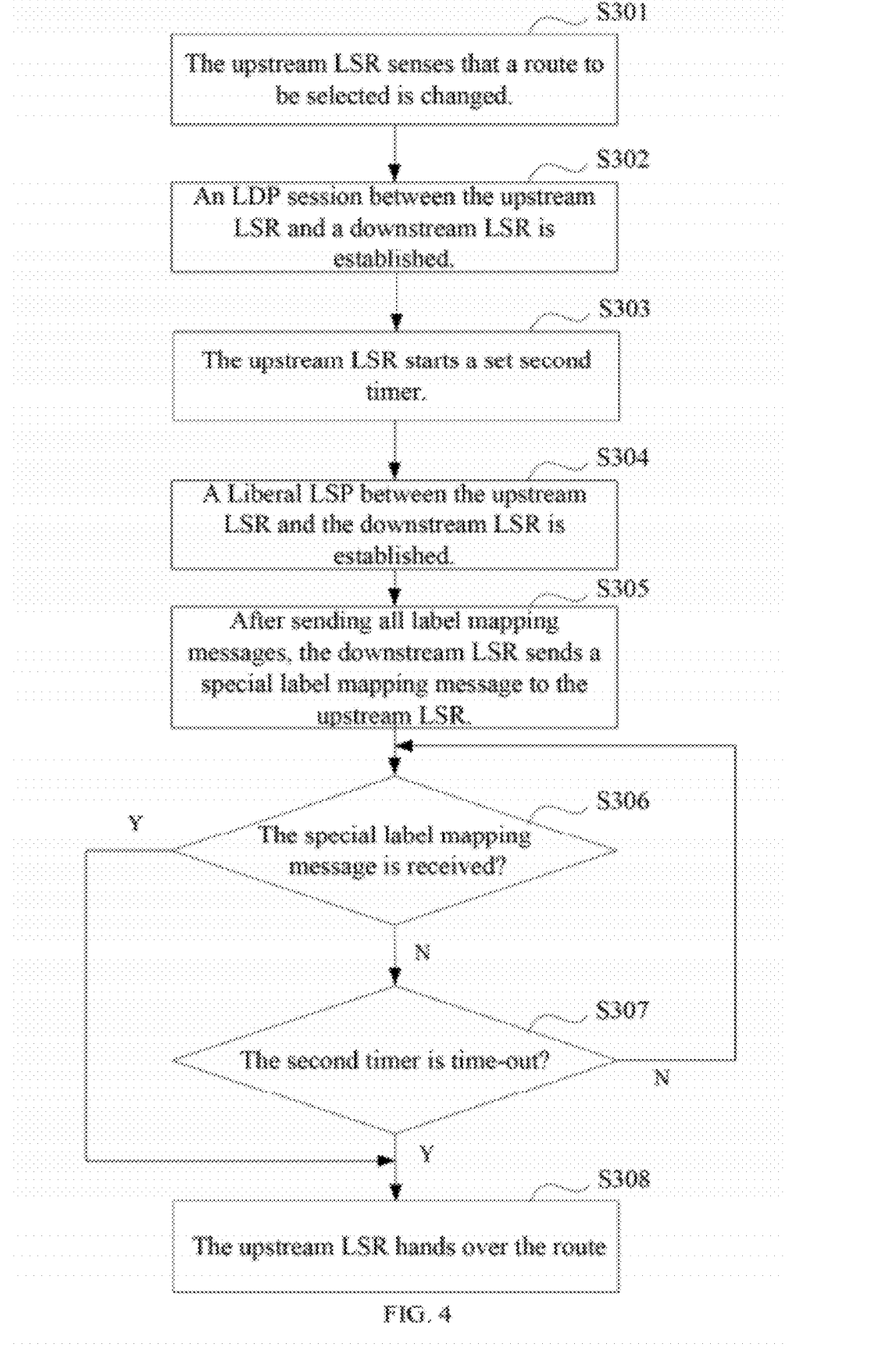
FIG. 4 is a flow chart of handing over a route by an upstream LSR according to another embodiment of the present invention.

In Step S301, the upstream LSR senses that a route to be selected is changed.

In Step S302, an LDP session between the upstream LSR and a downstream LSR is established.

In Step S303, the upstream LSR starts a set second timer.

In Step S304, a liberal LSP between the upstream LSR and the downstream LSR is established.

In Step S305, after sending all label mapping messages, the downstream LSR sends a special label mapping message to the upstream LSR.

In Step S306, the upstream LSR judges whether the special label mapping message is received or not, and if the special label mapping message is received, Step S308 is performed; if the special label mapping message is not received, Step S307 is performed.

In Step S307, the upstream LSR judges whether the second timer is time-out or not, and if the second timer is time-out, Step S308 is performed; if the second timer is not time-out, Step S306 is performed to continue the determination.

This step is that the upstream LSR judges whether a handover notification is received or not within a preset time period, which is realized through setting the second timer.

During the specific realization, the present invention is not limited to firstly judging whether the special label mapping message is received or not or firstly judging whether the second timer is time-out or not.

In Step S308, the upstream LSR hands over the route.

In the above flow, the second timer may protect a mechanism for sending a special label mapping message. If the upstream LSR fails to receive the special label mapping message due to certain special situation, as long as the second timer is time-out, the upstream LSR hands over the route. In this manner, the upstream LSR is prevented from waiting for an excessive long time so as to avoid influencing the convergence time of handing over the route. For example, the special label mapping message is lost during the transmission process, the upstream LSR may handover the route after the timer is time-out. Definitely, since the timer has the protecting function, the value of the time may be set to be sufficiently long so as to ensure that the upstream LSR may receive the special label mapping message before the timer is time-out under normal situations. For example, the value of the timer may be set to be larger than an empirical value for receiving the special label mapping message, or the value of the timer is set to be a maximum value for accomplishing the establishment of the liberal LSP.

In order to interwork with LSRs neither having a function of sending the handover notification nor having a function of identifying the handover notification, the function that the upstream LSR identifies the handover notification and the function that the downstream LSR sends the handover notification may be configured in this embodiment. Similarly, in order to interwork with the LSRs neither having the function of sending the handover notification nor having the function of identifying the handover notification, a second timer is set in the upstream LSR in this embodiment.

In this embodiment, when the function that the upstream LSR identifies the handover notification is configured, no matter whether the downstream LSR thereof has the function of sending the handover notification or not, the function that the upstream LSR identifies the handover notification is enabled. The reason is that, if the downstream LSR thereof has the function for sending the handover notification, the upstream LSR may confirm the occasion for handing over the route according to a corresponding handover notification and the second timer. Otherwise, the upstream LSR may confirm occasion for handing over the route merely according to the second timer.

Figure 5:
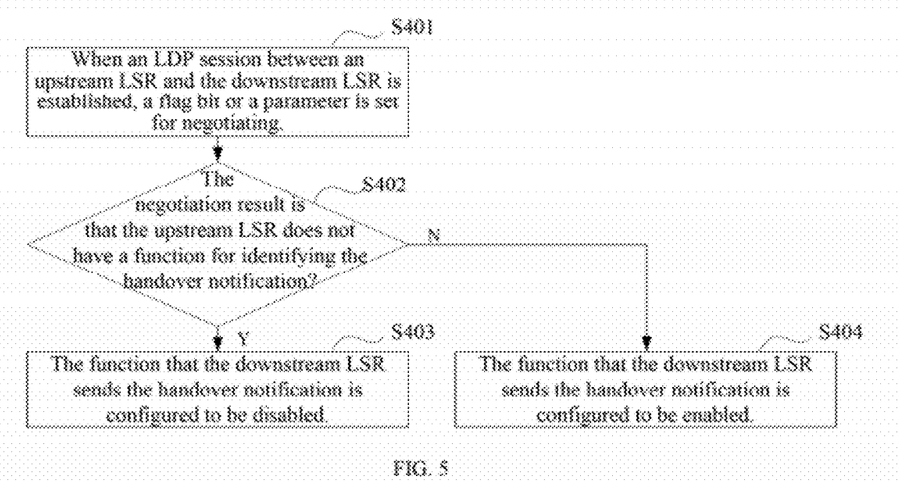
FIG. 5 is a flow chart of configuring a downstream LSR according to an embodiment of the present invention.

In one embodiment of the present invention, referring to FIG. 5, a flow of configuring a downstream LSR includes the steps as follows.

In Step S401, when an LDP session between an upstream LSR and the downstream LSR is established, a flag bit or a parameter is set for negotiating.

During the specific realization, a corresponding notification message is sent for negotiating.

In Step S402, it is judged whether a negotiation result is that the upstream LSR does not have a function for identifying the handover notification or not, and if the upstream LSR has the function for identifying the handover notification, Step S403 is performed; if the upstream LSR does not have the function for identifying the handover notification, Step S404 is performed.

In Step S403, the function that the downstream LSR sends the handover notification is configured to be disabled.

The reason thereof lies in that, the upstream LSR does not have the function for identifying the handover notification, so that the upstream LSR may process the special label mapping message as a fatal error packet, thereby resulting in an abnormal data forwarding. In this case, the function that the downstream LSR sends the handover notification should be configured to be disabled.

In Step S404, the function that the downstream LSR sends the handover notification is configured to be enabled.

When the downstream LSR judges whether all the label mapping messages adapted to establish the liberal LSP have been sent completely or not, the following realization manners may be adopted.

The downstream LSR processes a list including all the FEC information, and confirms that sending the label mapping messages is accomplished to the upstream LSR when the identity information added to an end of the list is processed.

Figure 6:
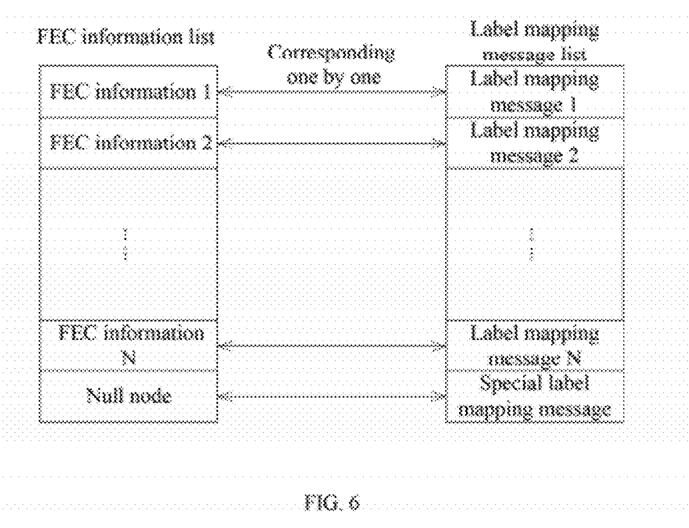
FIG. 6 is a schematic view of a corresponding relation between an FEC information list and a label mapping message list according to an embodiment of the present invention.

Particularly, when the LDP session is established, the identity information is added to the end of the FEC information list, for example, one null node is added to the end of the FEC information list, as shown in FIG. 6. When the LDP establishes the liberal LSP, the sequence for sending the label mapping messages is consistent with that of the FEC information list, that is, the LDP sends the label mapping messages according to the sequence of the FEC information list. As known from the relation between the FEC information list and the label mapping message list shown in FIG. 6, when the LDP processes the null node at the end of the FEC information list, it represents that all the previous FEC information have been processed, so that the LSR confirms that all the label mapping messages are sent so as to send the special label mapping message to the upstream LSR.

In one embodiment of the present invention, after the downstream LSR confirms that all the label mapping messages are sent, the step of sending the special label mapping message to the upstream LSR includes the processes as follows.

A preset first timer is reset when the downstream LSR sends one label mapping message each time. After the first timer is time-out, the downstream LSR confirms that sending the label mapping message to the upstream LSR is accomplished.

Particularly, the downstream LSR starts one first timer exclusively adapted to judge whether establishing the liberal LSPs is entirely accomplished or not, in which the time of the first timer may be configured by a user, or a certain empirical value is taken as a default time interval. Once a sending end sends a label mapping message according to the FEC information, the first timer is restarted, and continues to count the time from zero (that is, the timer is reset). In this manner, if the first timer is time-out, it represents that the sending end does not send any label mapping message within the designated time interval, and all the current FEC information have been processed, so that the downstream LSR confirms that all the label mapping messages are sent so as to send the special label mapping message.

The information structure of the special label mapping message in the present invention may adopt a plurality of manners, for example, manner A and manner B.

Manner A

The number of FEC in the former FEC type-length-value (TLV) is set to zero.

Figure 7:
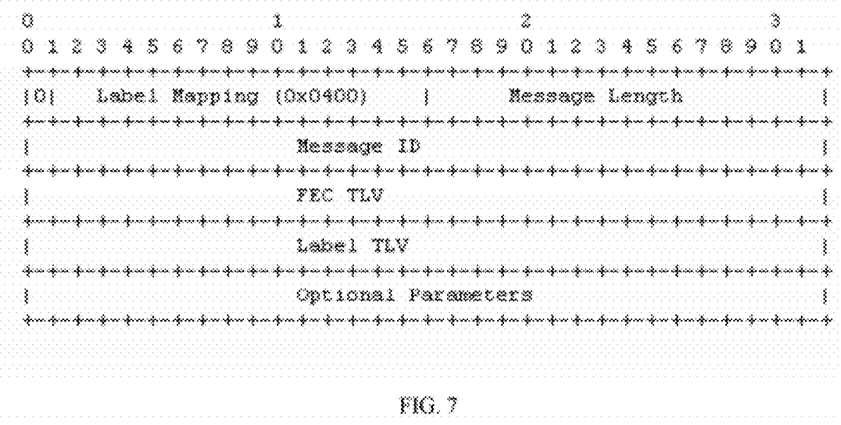
FIG. 7 is a schematic structural view of a label mapping message.

Referring to FIG. 7, the label mapping message includes the following fields: Label Mapping for identifying that the current message is a label mapping message, Message Length, Message ID, Label TLV, and Optional Parameters. In the label mapping message adapted to establish the liberal LSP, the FEC information corresponding to the liberal LSP is carried in the FEC TLV. The special label mapping message is not adapted to establish the liberal LSP, and it does not have the corresponding FEC, so the FEC list in the FEC TLV may be null. In this manner, if a receiving end LSR finds that the FEC list in the received label mapping message is null when decoding the received label mapping message, it is considered that the label mapping message is one special label mapping message, and the label mapping messages of the peer-end downstream node are sent, and then the receiving end LSR takes corresponding measures.

Manner B

A TLV field exclusively adapted to identify the special label mapping message is added to the former label mapping message.

Figure 8:
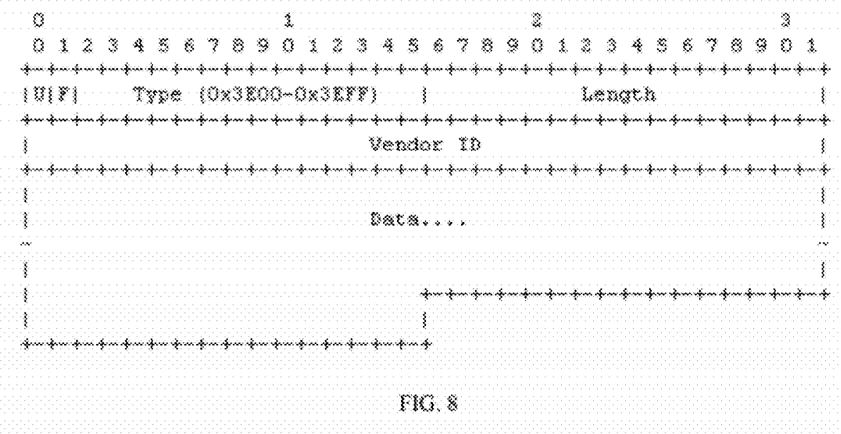
FIG. 8 is a schematic structural view of a Vendor-private TLV.

Particularly, a Vendor-private TLV described in RFC 3036 may be used, and referring to FIG. 8, the structure thereof includes a U field, an F field, a Type field, a Length field, a Vendor ID, and a Data field.

In a special label mapping message, the Vendor-private TLV may be set that U=1 and F=0. U=1 represents that the TLV may be silently neglected, that is, the receiving end does not send any notification message about the TLV to the sending end when processing the TLV. F=0 represents that the receiving end does not send the TLV to other LSRs when processing the TLV. If the manner B is adopted, when the function that the receiving end identifies the special label mapping message is configured, the Type field and the Vendor ID field of the Vendor-private TLV are further agreed. In this manner, if the receiving end LSR finds that both the Type field and the Vendor ID field of the Vendor-private TLV satisfy the numerical values agreed in advance when decoding the received label mapping message, it is considered that the label mapping message is a special label mapping message, and then the receiving end LSR takes corresponding measures.

If the manner B is adopted, when the function that the receiving end identifies the special label mapping message is configured, the Type field and the Vendor ID field of the Vendor-private TLV are further agreed. In this manner, if the receiving end LSR finds that both the Type field and the Vendor ID field of the Vendor-private TLV satisfy the numerical values agreed in advance when decoding the received label mapping message, it is considered that the label mapping message is a special label mapping message, and then the receiving end LSR takes corresponding measures. For example, when the LDP session between the upstream LSR and the downstream LSR is established, the Type field and the Vendor ID field of the Vendor-private TLV are agreed.

During the specific realization, the special label mapping message may adopt other message types of the LDP (for example, notification message, advertisement message, and session message) as a carrier, or adopt other TLV fields (for example, Label TLV and Optional Parameters) in the label mapping message to notify the upstream LSR.

The special label mapping message is a notification message for notifying that advertising the label is accomplished.

During the specific realization, a newly added message type or a newly added TLV field may be adopted.

By adopting the technical solution of the embodiment of the present invention, a more accurate occasion for handing over the route is obtained so as to avoid the label forwarding interruption and reduce the influences on the convergence time of handing over the route. Furthermore, if no handover request is received within the preset time period the upstream LSR is enabled to handover the route when the preset time period is reached so as to ensure that the waiting time is within a desired scope.

During the specific implementation, the LSP is established and the label is advertised between LDP neighbors. In the above embodiment, the upstream LSR and the downstream LSR is one type of specific LDP neighbors, and actually, the embodiments of the present invention may be particularly applied between various LDP neighbors. In the above detailed embodiment, the label mapping message is sent between the LDP neighbors, and during the specific implementation, the label may be advertised.

In the above embodiment, the technical solution is described by taking the realization of handing over the route as an example. During the specific implementation, after the label is sent, a notification message is sent to the LDP neighbor, and after receiving the notification message, the LDP neighbor enters a smooth restarting stage. Practically, the label may be advertised to the LDP neighbor. When advertising the label is accomplished, a notification message is sent to the LDP neighbor. The notification message represents that advertising the label is accomplished, and then the LDP neighbor hands over the route and enters the smooth restarting stage and the like according to the notification message.

It should be appreciated by those skilled in the art that, all or a part of the steps in the method of the above embodiments may be completed by relevant hardware under the instruction of a program, and the program may be stored in a computer readable storage medium. When the program is executed, the following steps are performed, including establishing a liberal LSP between an upstream LSR and a downstream LSR, confirming that establishing the liberal LSP is accomplished, sending a handover notification to the upstream LSR, and handing over the route by the upstream LSR according to the handover notification. The storage medium is, for example, a read only memory (ROM)/random access memory (RAM), a diskette, and a compact disc, etc.

It should be appreciated by those skilled in the art that, all or a part of the steps in the method of the above embodiments may be completed by relevant hardware under the instruction of a program, and the program may be stored in a computer readable storage medium. When the program is executed, the following steps are performed, including advertising a label to an LDP neighbor; sending a notification message to the LDP neighbor after advertising the label is accomplished, in which the notification message represents that advertising the label is accomplished; handing over the route or entering a smooth restarting stage by the LDP neighbor according to the notification message.

Figure 9:
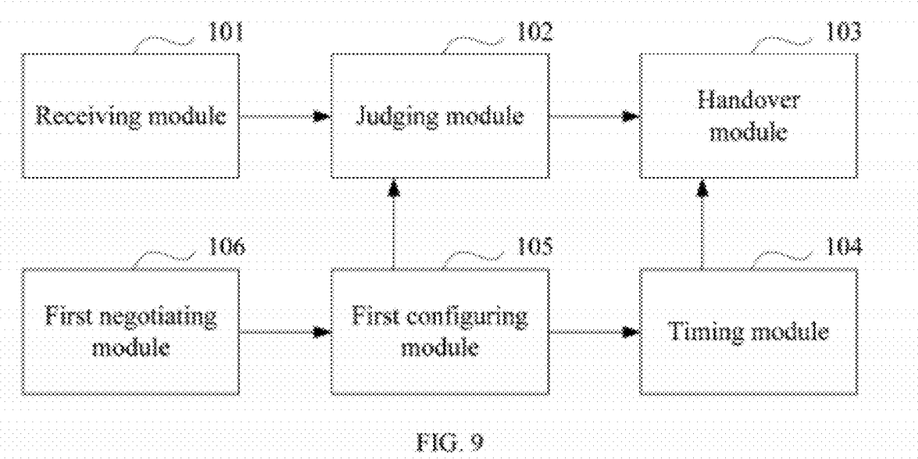
FIG. 9 is a block diagram of an LSR serving as the upstream LSR according to an embodiment of the present invention.

Referring to FIG. 9, one embodiment of the present invention provides an LSR which is capable of serving as an upstream LSR. The LSR includes a receiving module 101, a determining module 102, and a handoff module 103.

The receiving module 101 is adapted to receive a message.

The judging module 102 is adapted to judge whether the message received by the receiving module 101 is a handover notification sent by a downstream LSR of the LSR or not, in which the handover notification identifies that establishing a liberal LSP between the two LSRs is accomplished.

The handover module 103 is adapted to handover a route after the judging module 102 determines that the message is the handover notification.

The LSR further includes a timing module 104, which is adapted to instruct the handover module 103 to handover the route when reaching a preset time period if receiving no handover notification within the preset time period.

The LSR further includes a first configuring module 105, which is adapted to configure a state of the judging module 102 and/or the timing module 104 to be enabled or disabled.

The LSR further includes a first negotiating module 106, which is adapted to negotiate with the downstream LSR so as to get to know whether the downstream LSR has a function for sending the handover notification or not, and instruct the first configuring module 105 to perform a configuration according to a negotiation result.

Figure 10:
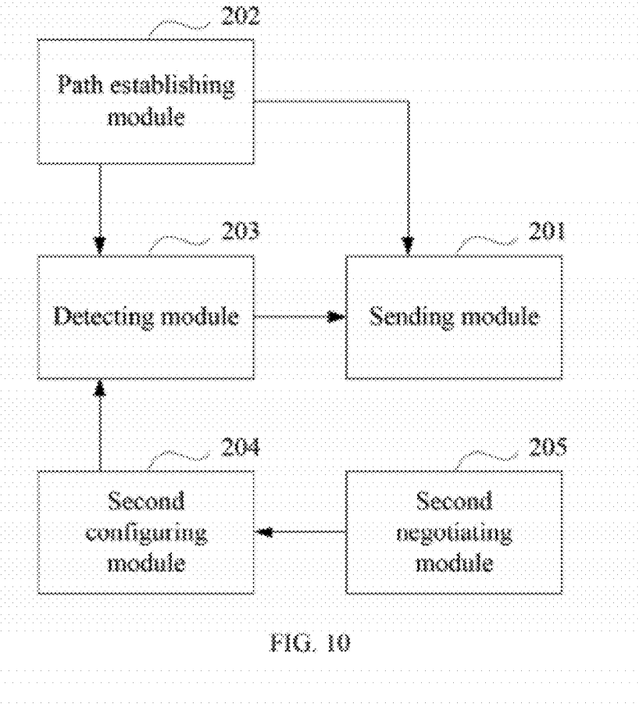
FIG. 10 is a block diagram of an LSR serving as the downstream LSR according to an embodiment of the present invention.

Referring to FIG. 10, the LSR in this embodiment may serve as a downstream LSR, which includes a sending module 201, a path establishing module 202, and a detecting module 203.

The sending module 201 is adapted to send a message.

The path establishing module 202 is adapted to establish a liberal LSP between the LSR and an upstream LSR thereof through the sending module 201.

The detecting module 203 is adapted to detect whether establishing the LSP is accomplished or not, and instruct the sending module 201 to send a handover notification to the upstream LSR when detecting that establishing the LSP is accomplished.

The LSR further includes a second configuring module 204, which is adapted to configure a state of the detecting module 203 to be enabled or disabled.

The LSR further includes a second negotiating module 205, which is adapted to negotiate with the upstream LSR so as to get to know whether the upstream LSR has a function for identifying the handover notification or not, and instruct the second configuring module 204 to perform a configuration according to a negotiation result.

By adopting the above LSR, a more accurate occasion for handing over the route is obtained so as to avoid the label forwarding interruption and reduce the influences on the convergence time of handing over the route. Furthermore, the function for the LSR relevant to the handover notification can be configured, so that the LSR is well compatible with the existing system.

Figure 11:
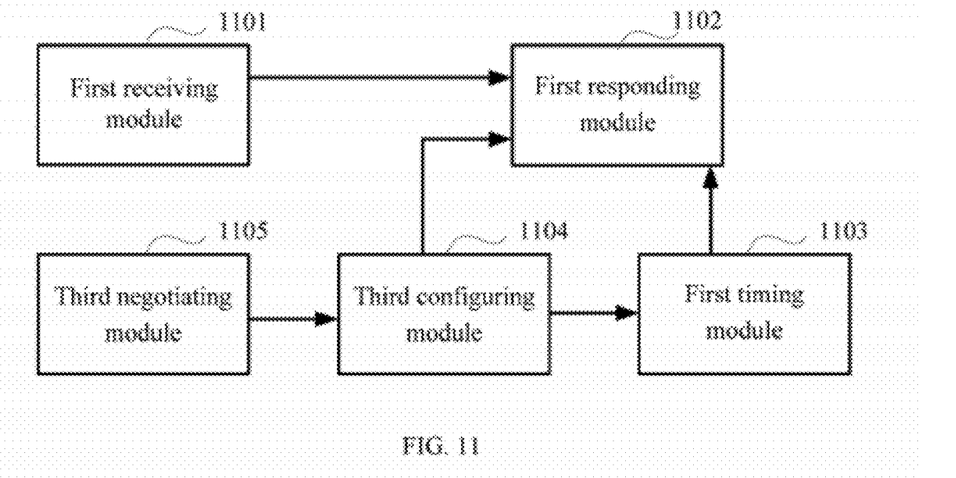
FIG. 11 is a structural block diagram of a network device according to the present invention.

Referring to FIG. 11, another embodiment of the present invention provides a network device. The network device includes a first receiving module 1101 and a first responding module 1102.

The first receiving module 1101 is adapted to receive a message.

The first responding module 1102 is adapted to perform a responding operation after the first receiving module 1101 receives a notification message that advertising a label is accomplished sent by an LSP neighbor, in which the responding operation includes handing over a route or entering a smooth restarting stage.

The device further includes a first timing module 1103, which is adapted to instruct the first responding module 1102 to perform the responding operation when receiving no notification representing that advertising the label is accomplished is received within a preset time period.

The device further includes a third configuring module 1104, which is adapted to configure a state of the first responding module 1102 or the first timing module 1103 to be enabled or disabled.

The device further includes a third negotiating module 1105, adapted to negotiate with an LDP neighbor of the LSR so as to get to know whether the LDP neighbor has a function for sending the notification representing that advertising the label is accomplished, and instruct the third configuring module 1104 to perform a configuration according to a negotiation result.

Figure 12:
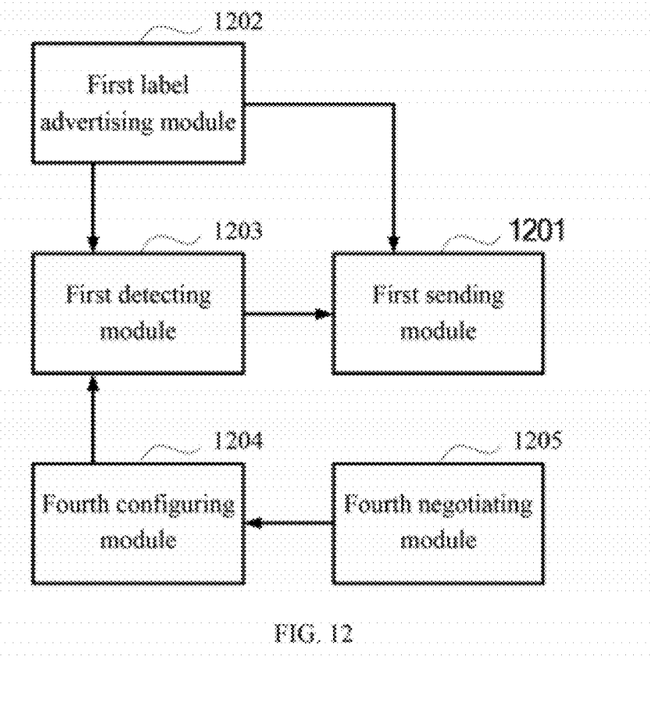
FIG. 12 is another structural block diagram of a network device according to the present invention.

Referring to FIG. 12, a network device is provided in this embodiment, which includes a first sending module 1201, a first label advertising module 1202, and a first detecting module 1203.

The first sending module 1201 is adapted to send a message.

The first label advertising module 1202 is adapted to advertise a label to an LDP neighbor of the network device through the first sending module 1201.

The first detecting module 1203 is adapted to detect whether advertising the label of the network device is accomplished or not, and instruct the first sending module 1201 to send a notification representing that advertising the label is accomplished to the LDP neighbor when detecting that advertising the label is accomplished.

The device further includes a fourth configuring module 1204, which is adapted to configure a state of the first detecting module 1203 to be enabled or disabled.

The device further includes a fourth negotiating module 1205, which is adapted to negotiate with the LDP neighbor of the device so as to get to know whether the LDP neighbor has a function for identifying the notification representing that advertising the label is accomplished, and instruct the fourth configuring module 1204 to perform a configuration according to a negotiation result.

By adopting the above network device, a more accurate occasion for handing over the route and the like may be obtained so as to avoid the label forwarding interruption and reduce the influences on the convergence time of handing over the route. Furthermore, the function of the network device relevant to the notification representing that advertising the label is accomplished can be configured and negotiated, so that the network device is well compatible with the existing system.

Figure 13:
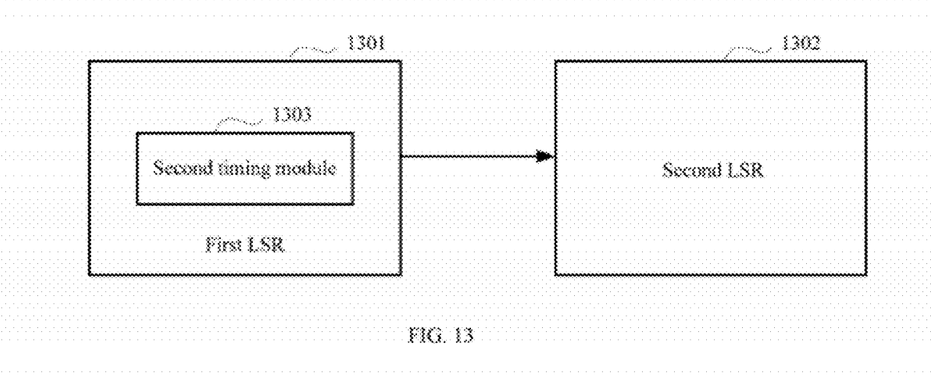
FIG. 13 is a block diagram of a communication system according to the present invention.

Referring to FIG. 13, a communication system is provided in this embodiment, which includes a first LSR 1301 and a second LSR 1302.

The first LSR 1301 is adapted to confirm that establishing a liberal LSP between the first LSR 1301 and the second LSR 1302 is accomplished, and send a handover notification to the second LSR 1302.

The second LSR 1302 is adapted to handover a route according to the handover notification sent by the first LSR 1301.

The first LSR 1301 further includes a second timing module 1303, which is adapted to handover the route when reaching a preset time period, if receiving no handoff notification by the first LSR 1301 within the preset time period.

Figure 14:
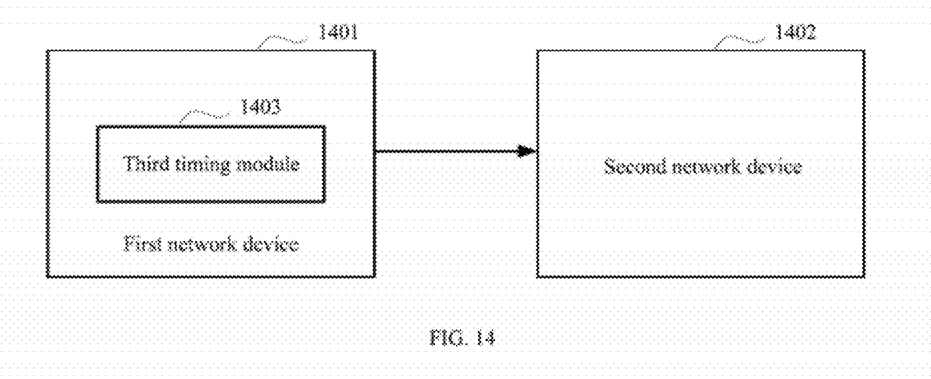

Referring to FIG. 14, a communication system is provided in another embodiment, which includes a first network device 1401 and a second network device 1402.

The first network device 1401 is adapted to confirm that advertising a label is accomplished between the first network device 1401 and an LDP neighbor thereof, that is, the second network device 1402, and send a notification representing that advertising the label is accomplished to the second network device 1402.

The second network device 1402 is adapted to perform responding operation such as handing over the route and the like according to the notification that advertising the label is accomplished sent by the first network device 1401.

The first network device 1401 further includes a third timing module 1403, which is adapted to perform the responding operation such as handing over the route and the like when receiving no notification representing that advertising the label is accomplished by the first network device 1401 within the preset time period.

To sum up, by adopting the technical solution of the embodiments of the present invention, the downstream LSR notifies the upstream LSR according to the operation result of the downstream LSR, instead of handing over the route by the upstream LSR according to the estimated time for establishing the liberal LSP so as to obtain the accurate occasion for handing over the route. Therefore, the technical solution of the embodiments of the present invention can avoid the label forwarding interruption and reduce the influences on the convergence time of handing over the route. Furthermore, the upstream LSR is enabled to handover the route when receiving no handoff request is received within a preset time period so as to ensure that the waiting time falls within a desired scope, thereby protecting the handover notification mechanism. In the embodiments of the present invention, the function for the LSR relevant to the handover notification can be configured, so that the LSR is well compatible with the existing system.

It should be understood that the above exemplary embodiments are only used to explain, but not to limit the technical solution of the present invention. In despite of the detailed description of the present invention with reference to above embodiments, it should be understood that various modifications, changes or equivalent replacements can be made by those skilled in the art without departing from the spirit and scope of the present invention and covered in the claims of the present invention.

What is claimed is:

1. A method for handing over a route, comprising:
    establishing a label switched path between an upstream label switched router and a downstream label switched router; and
    receiving a notification message representing that sending a label mapping message is accomplished, and confirming that establishing the label switched path is accomplished, wherein the notification message representing that sending the label mapping message is accomplished is a handover notification sent by the downstream label switched router;
    wherein if no handover notification is received within a preset time period, the upstream label switched router hands over the route when reaching the preset time period.

2. The method according to claim 1, further comprising:
    handing over, by the upstream label switched router, the route according to the handover notification, wherein the handover notification is a special label mapping message carrying an identity information, and the identity information identifies that establishing the label switched path is accomplished;
    and the handing over, by the upstream label switched router, the route according to the handover notification comprises: obtaining, by the upstream label switched router, the identity information from the received special label mapping message, and handing over the route.

3. The method according to claim 1, wherein confirming that sending the label mapping message is accomplished comprises:
    processing a list comprising all forwarding equivalence class (FEC) information, and confirming that sending the label mapping message is accomplished when an identity information added to an end of the list is processed.

4. The method according to claim 1, wherein confirming that sending the label mapping message is accomplished comprises:
    resetting a preset first timer when the downstream label switched router sends one label mapping message each time; and
    confirming that sending the label mapping message is accomplished after the first timer is time-out.

5. A method for notifying a state of advertising a label, comprising:
    advertising a label to a label switched path neighbor; and
    sending a notification message representing that advertising the label is accomplished after advertising the label is accomplished so as to notify the label switched path neighbor that advertising the label is accomplished;
    wherein the notification message is a label mapping message and the method further comprises:
    setting a forwarding equivalence class list in a type-length-value (TLV) of the forwarding equivalence class in the label mapping message to null, wherein the label mapping message serves as a notification message representing that sending the label mapping message is accomplished.

6. A label switched router, comprising:
    a receiving module, adapted to receive a message;
    a judging module, adapted to judge whether the message received by the receiving module is a handover notification sent by a downstream label switched router of the label switched router or not, wherein the handover notification identifies that establishing a liberal label switched path between the label switched routers is accomplished;
    a handover module, adapted to handover a route after the judging module determines that the message is the handover notification; and
    a timing module, adapted to instruct the handover module to handover the route when reaching a preset time period if no handover notification is received within the preset time period.

7. The label switched router according to claim 6, further comprising: a first configuring module and a first negotiating module; wherein:
    the first configuring module is adapted to configure a state of the judging module and/or the timing module to be enabled or disabled; and
    the first negotiating module is adapted to negotiate with the downstream label switched router so as to get to know whether the downstream label switched router has a function for sending the handover notification or not, and instruct the first configuring module to perform a configuration according to a negotiation result.

8. A label switched router, comprising
    a sending module, adapted to send a message;
    a path establishing module, adapted to establish a liberal label switched path between the label switched router and an upstream label switched router thereof through the sending module;
    a detecting module, adapted to detect whether establishing the label switched path is accomplished or not, and instruct the sending module to send a handover notification to the upstream label switched router when detecting that establishing the label switched path is accomplished;

a second configuring module and a second negotiating module; wherein:

the second configuring module is adapted to configure a state of the detecting module to be enabled or disabled; and the second negotiating module is adapted to negotiate with the upstream label switched router so as to get to know whether the upstream label switched router has a function for identifying the handover notification or not, and instruct the second configuring module to perform a configuration according to a negotiation result.

9. A communication system, comprising:

a first label switched router, adapted to confirm that establishing a liberal label switched path between the first label switched router and an upstream label switched router thereof is accomplished, and send a handover notification to the upstream label switched router; and a second label switched router, adapted to handover a route according to the handover notification;

wherein the first label switched router further comprises a timing module, adapted to handover the route when receiving no handoff notification by the first label switched router within a preset time period.

10. A network device, comprising:

a receiving module, adapted to receive a message;

a responding module, adapted to perform a responding operation after the receiving module receives a notification message that advertising a label is accomplished sent by a label switched path neighbor; and a timing module, adapted to instruct the responding module to perform the responding operation when reaching a preset time period, if no notification message is received within the preset time period.

11. A network device, comprising:

a sending module, adapted to send a message;

a label advertising module, adapted to advertise a label to a label distribution protocol (LDP) neighbor of the network device through the sending module;

a detecting module, adapted to detect whether advertising the label of the network device is accomplished or not, and instruct the sending module to send a notification that advertising the label is accomplished to the LDP neighbor when detecting that advertising the label is accomplished; and a configuring module, adapted to configure a state of the detecting module to be enabled or disabled.

12. A method for notifying a state of advertising a label, comprising:

advertising a label to a label switched path neighbor; and sending a notification message representing that advertising the label is accomplished after advertising the label is accomplished so as to notify the label switched path neighbor that advertising the label is accomplished;

wherein the notification message is a label mapping message and the method further comprises:

adding an identity field in the type-length-value (TLV) of the label mapping message, wherein the added identity field represents that the label mapping message is a notification message representing that sending the label mapping message is accomplished.

* * * * *